Dec. 23, 1969  A. V. BEDFORD  3,485,237
SELF-PROPELLING HOSE

Filed March 20, 1967  5 Sheets-Sheet 1

INVENTOR
ALDA V. BEDFORD

BY Edward J. Norton
ATTORNEY

Dec. 23, 1969  A. V. BEDFORD  3,485,237
SELF-PROPELLING HOSE
Filed March 20, 1967  5 Sheets-Sheet 2

INVENTOR
ALDA V. BEDFORD
BY Edward J. Norton
ATTORNEY

Dec. 23, 1969     A. V. BEDFORD     3,485,237
SELF-PROPELLING HOSE
Filed March 20, 1967     5 Sheets-Sheet 3
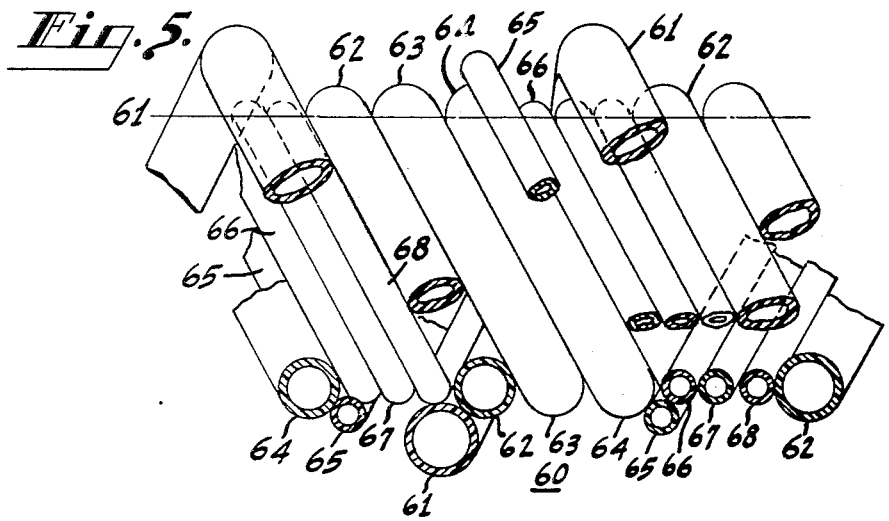
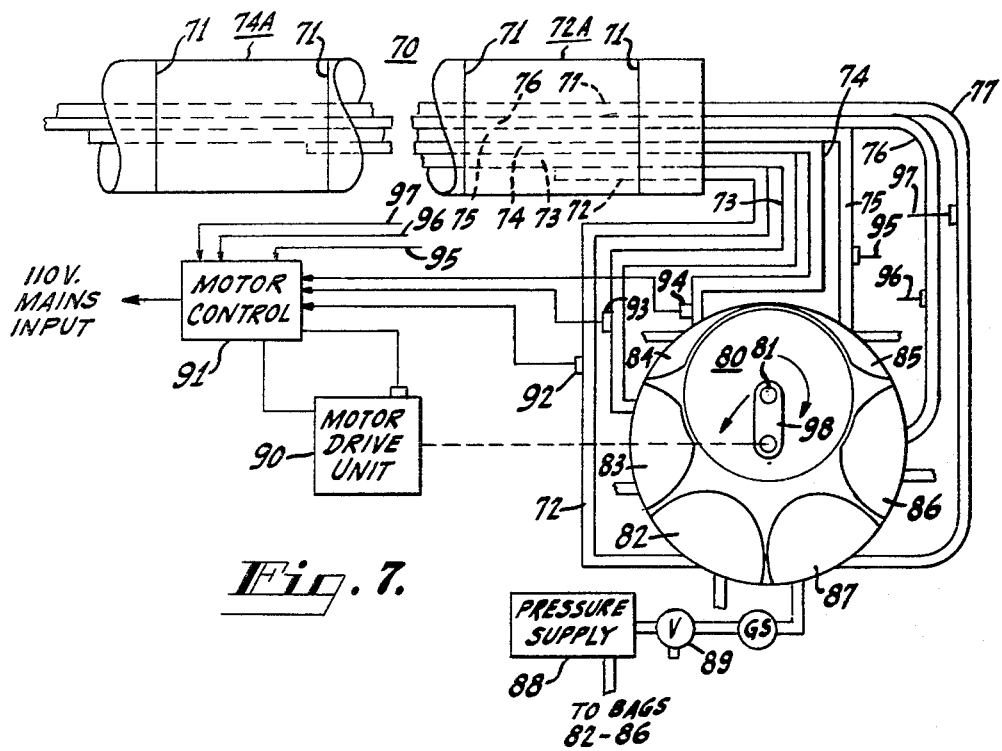
INVENTOR
ALDA V. BEDFORD
BY Edward J. Norton
ATTORNEY Dec. 23, 1969  A. V. BEDFORD  3,485,237
SELF-PROPELLING HOSE
Filed March 20, 1967  5 Sheets-Sheet 4

INVENTOR
ALDA V. BEDFORD
BY Edward J. Norton
ATTORNEY

Dec. 23, 1969  A. V. BEDFORD  3,485,237
SELF-PROPELLING HOSE
Filed March 20, 1967  5 Sheets-Sheet 5

INVENTOR
ALDA V. BEDFORD

BY Edward J. Norton
ATTORNEY

United States Patent Office 3,485,237
Patented Dec. 23, 1969

3,485,237
SELF-PROPELLING HOSE
Alda V. Bedford, Princeton, N.J., assignor to RCA
Corporation, a corporation of Delaware
Filed Mar. 20, 1967, Ser. No. 624,329
Int. Cl. A61b 1/00, 5/10
U.S. Cl. 128—2                            12 Claims

ABSTRACT OF THE DISCLOSURE

A self-propelling hose constructed of a plurality of tubular members helically wound in parallel is described. The tubular members expand and contract in a rhythmic fashion to propel the hose inside a tubular passage. The hose is flexible and is self-propelling along the entire length thereof, facilitating its use as a catheter for reaching far into the tubular organs of the body safely.

---

This invention relates to a self-propelling hose for insertion into and progression inside a tubular member. This invention particularly relates to a self-propelling clinical hose useful as a catheter for insertion into and exit out of a tubular organ of a living body.

A self-propelling hose which can be controlled remotely may be used to clean service pipes, remove obstructions in a tubular passage, and for many other such uses. A remotely controlled self-propelling hose has a particular application in the field of medicine where the hose acts as a catheter. A self-propelling hose or catheter can travel far into the tubular passages of the human body to take biopsy specimens, snare foreign objects, apply local medicine, pick-up television or photographic pictures, exercise intestinal muscles, and to accomplish many other medical purposes. It is particularly significant in the construction of such a device for medical uses that the hose possess maximum flexibility to pass along bends and be driven along its entire length so that the hose or catheter may be inserted considerable distances safely. By using a continuous drive along the length of the hose, the patient is subjected to no large force and discomfort at any one point due to a portion of the hose being dragged or otherwise pulled around bends in the course of its travel.

It is an object of this invention to provide an improved self-propelling hose for insertion into and progression along a tubular member.

Another object is to provide a self-propelling hose suitable for use as a catheter and which can be controlled from a remote point so as to be self-propelling along its entire length within a tubular organ of the body.

These and other objects and advantages of the present invention will become apparent to those skilled in the art from the following description thereof.

Briefly, in accordance with one embodiment of this invention, a self-propelling hose is constructed of a plurality of expandable tubular members. The tubular members are helically wound so that the turns thereof are disposed in parallel to define a larger tubular member. Part of the outer wall of each of the tubular members is joined along the length thereof to the outer wall of the adjacent tubular members, defining a hose. The tubular members are each terminated at one end. The tubular members are coupled at their respective other ends to a plurality of fluid pumps or other suitable means for rhythmically expanding and contracting the tubular members sequentially along their length. The operation is such that when a given tubular member expands it is frictionally held to and within the tubular passage into which the hose has been inserted, the other tubular members changing their relative position with respect to the given, expanded tubular member, providing the self-propelling motion.

Figure 1:
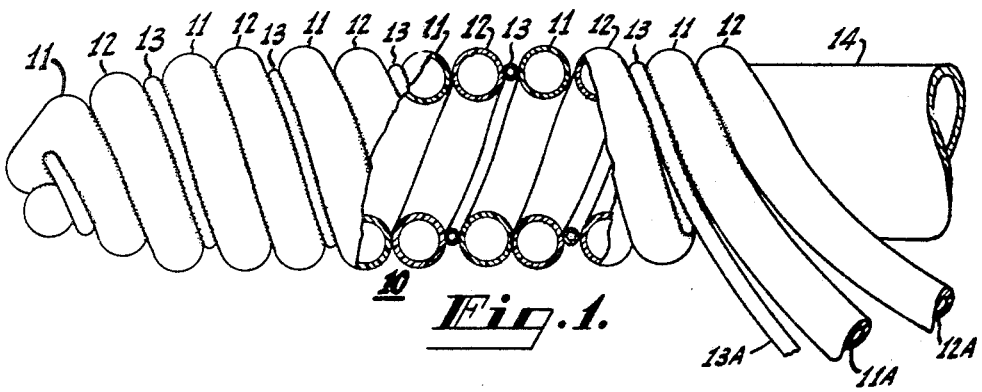
Figure 2:
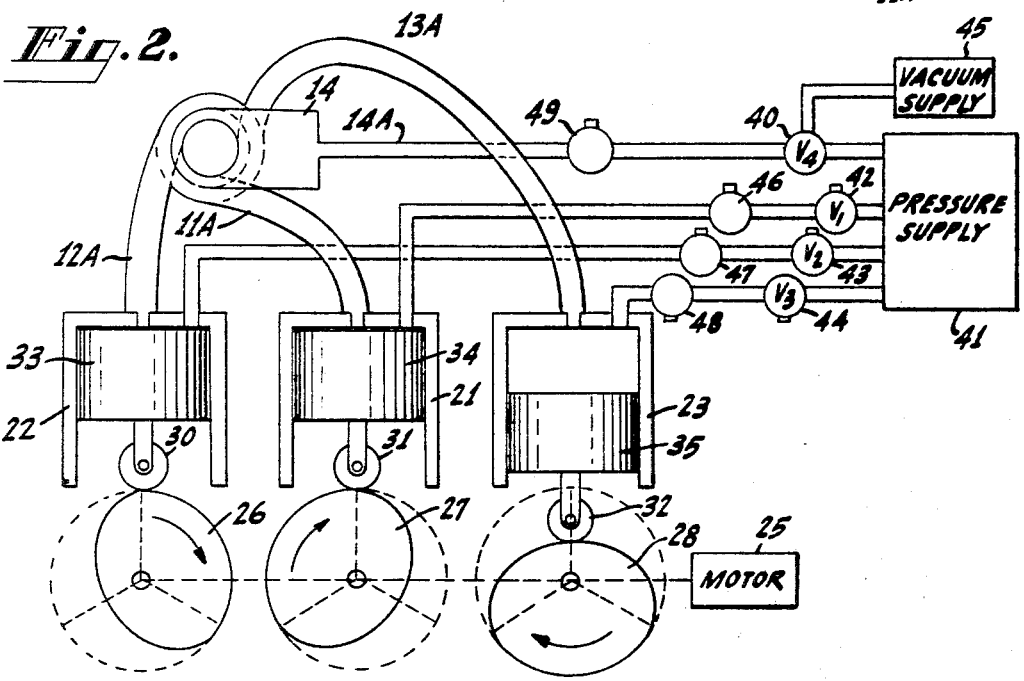
Figure 4:
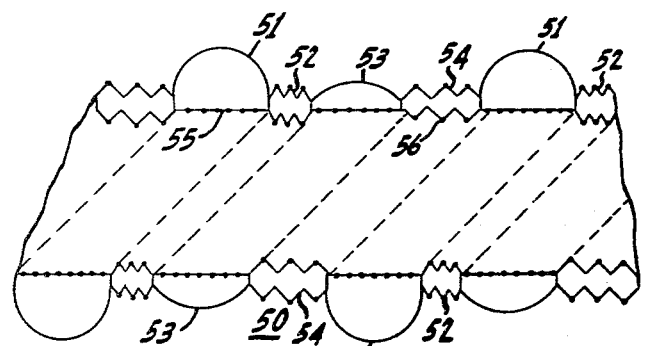
Figure 3:
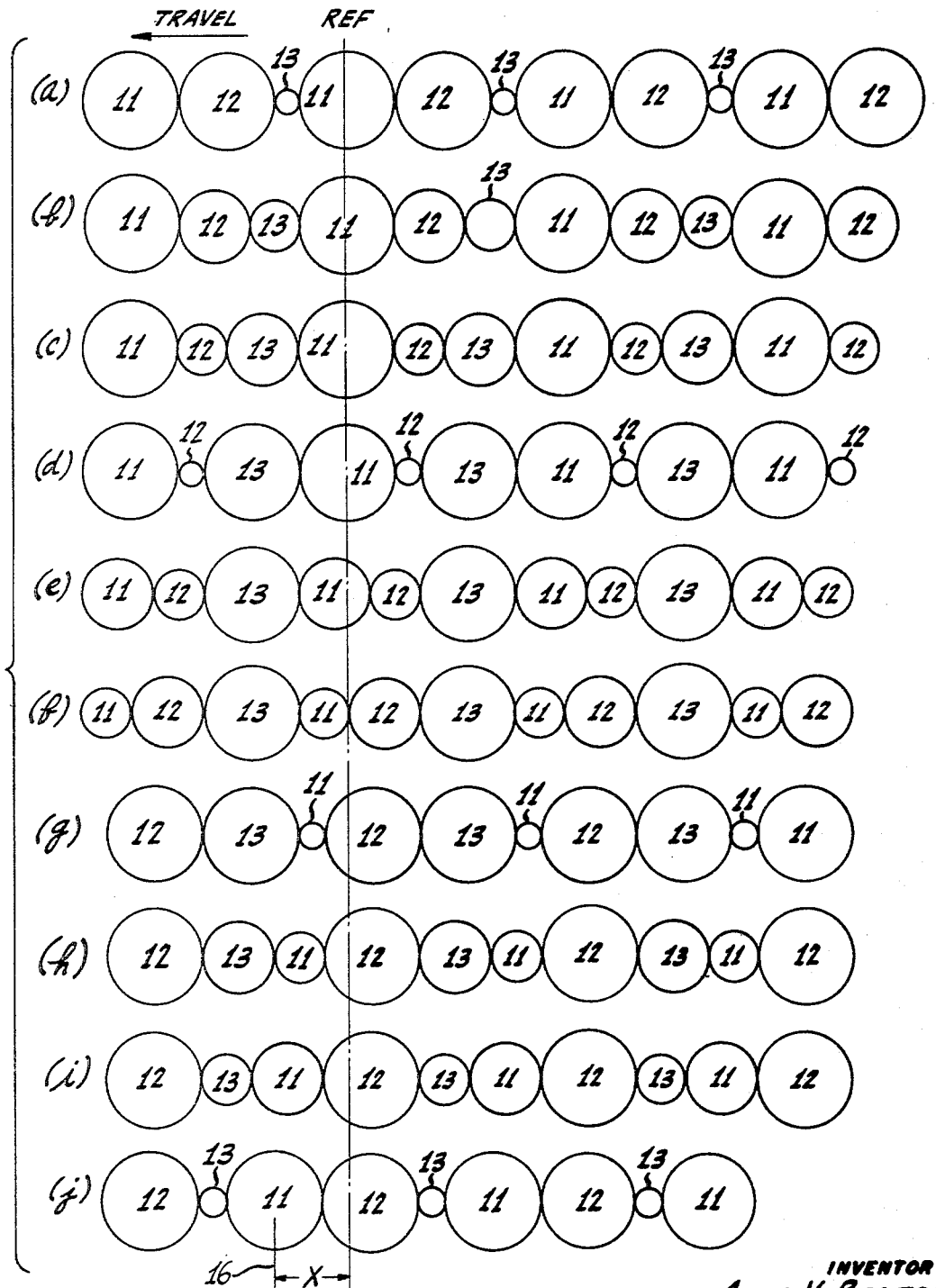
Figure 6:
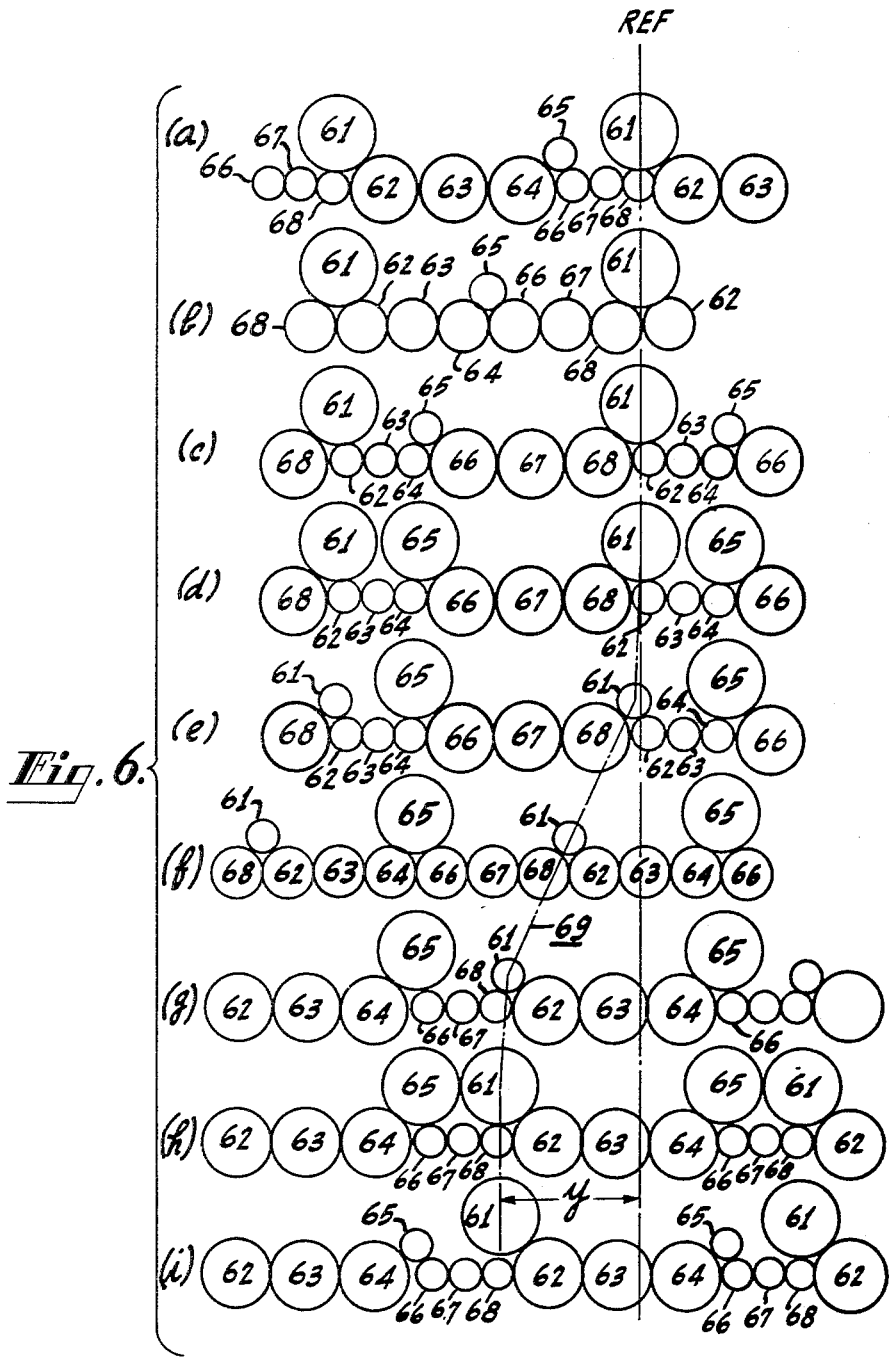
Figure 8:
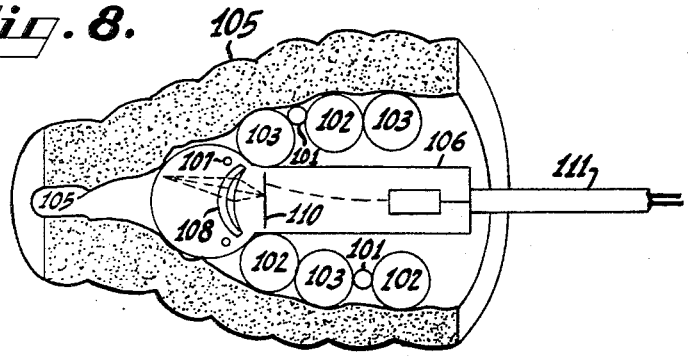
Figure 9:
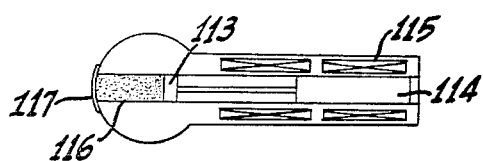
Figure 12:
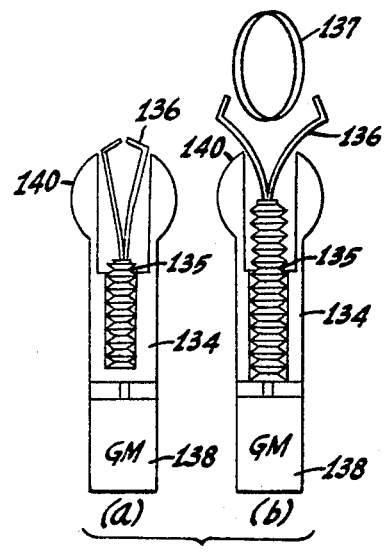
Figure 10:
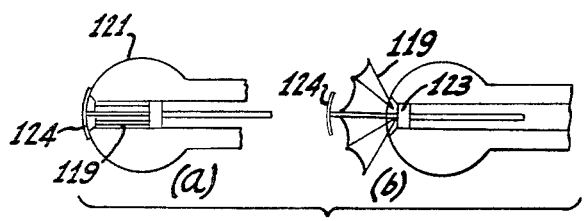
Figure 11:
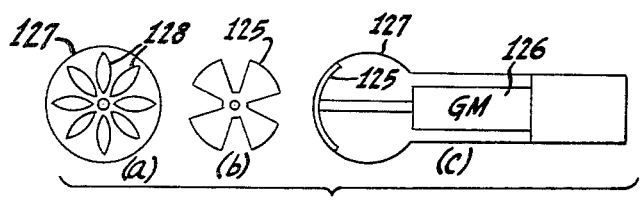

FIGURE 1 is a sketch of a self-propelling hose in accordance with a first embodiment of the present invention, FIGURE 2 is an illustration of a means for controlling the self-propelling hose shown in FIGURE 1, FIGURE 3 is a sequential diagram illustrating diagrammatically the operation of the embodiment shown in FIGURE 1, FIGURE 4 is a simplified cross-sectional sketch of a self-propelling hose in accordance with a second embodiment of the present invention, FIGURE 5 is a partial sketch of a self-propelling hose in accordance with a third embodiment of the present invention, FIGURE 6 is a sequential diagram illustrating diagramatically the operation of a self-propelling hose in accordance with the embodiment shown in FIG. 5, FIGURE 7 illustrates a mechanism to exercise and train muscles and nervous control systems of the human colon, FIGURE 8 illustrates the use of a television camera mounted at one end of a clinical hose, FIGURE 9 illustrates a local medicine applicator for use in the clinical hose, FIGURE 10 illustrates a magnetic solenoid device for use with a clinical hose, FIGURE 11 illustrates a surgical device at the end of the clinical hose, FIGURE 12 illustrates a pair of spring tongs at the end of the clinical hose.

In accordance with one preferred embodiment of the present invention, there is shown in FIGURE 1 a self-propelling hose 10 constructed of three expandable and flexible tubes 11, 12 and 13. The term "tube" as used herein refers to a flexible and expandable tubular member which may be constructed of rubber or other suitable material and may be constructed in small sizes to permit entry into the living organs. The tubes 11, 12 and 13 are wound in a manner to form a plurality of parallel helices defining the larger tubular member or hose 10. Part of the hose 10 shown in FIGURE 1 is cut away to show a cross-section of the three expandable tubes 11, 12 and 13. The outer walls of adjacent ones of the tubes 11, 12 and 13 are joined together continuously along the length of the respective tubes 11, 12, 13 (as by rubber cement or vulcanization) to determine the shape of the hose 10. The tubes 11, 12 and 13 are terminated at the left as shown in FIGURE 1, and the tubes 11, 12, 13 are joined together at this same end to terminate the hose 10. The hose 10 tapers to a smaller diameter toward the terminated end in order to facilitate insertion into tubular organs and the passage of the hose 10 around abrupt bends. At the opposite or right of the hose 10 is sealed a conventional hose 14 which may likewise be of rubber or other such suitable material to allow the application of fluid under pressure, for example, to the inside of the hoses 10 and 14. In the embodiment shown in FIG. 1, only the first few turns of the tubes 11, 12 and 13 encircle the hose 14 to provide a single, unified hose-like structure composed of the two parts 10 and 14. Only a short length of the hose 10 is shown for purposes of simplicity, the actual length being determined in practice according to the needs of the particular application.

The hose 10 is controlled from a remote point by connecting the extensions of the tubes 11, 12 and 13, labelled as tubes 11A, 12A and 13A, to suitable driving means shown in FIG. 2 as three motor driven pumps 22, 21 and 23, respectively. The pumps 22, 21 and 23 sequentially expand and contract the tubes 12, 11 and 13, respectively. A reversable motor 25 drives cams 26, 27 and 28 arranged in phases 120° apart for propelling the hose 10. The cams 26, 27 and 28 are in contact with respective rollers 30, 31 and 32 which drive the respective pistons 33, 34 and 35. A pressure supply 41 and valves 42, 43 and 44 supply the desired mean fluid pressure to the pumps 22, 21 and 23, corresponding to the tubes 12A, 11A and 13A. The pressure supply 41 and the vacuum supply 45 supplies and controls the pressure through adjustable valve 40 inside hose 14 and hose 10. The pumps 22, 21 and 23 sequently change the pressure in tubes 11, 12 and 13 to self-propel the hose 10.

In the view presented in FIGURES 1 and 2, the pressure in pumps 22 and 21 and corresponding tubes 12 and 11, respectively, is indicated as being greater than the mean fluid pressure supplied through adjustable valves 42, 43 due to compression by the pistons 33 and 34. The pressure in pump 23 and corresponding tube 13 is less than the mean fluid pressure through adjustable valve 44 because of the loss in compression due to the position of piston 35. Safety valves and gages 46 through 48 may be provided to control and monitor the mean fluid pressures in the system.

In the operation of the embodiment shown in FIGURES 1 and 2, the self-propelling action in either direction is controlled by controlling the expansion and contraction of the three small tubes 11, 12 and 13 in a prescribed sequence. The self-propelling action of the hose can be understood by a diagram shown in FIG 3. The top row (a) shows the first stage wherein the circles represent the relative diameters of the tubes 11, 12 and 13 for the particular phase of the cycle shown in FIGURES 1 and 2. Note that only tube 13 is contracted due to the position of the piston 35. Rows (b) through (j) in FIGURE 3 show the progressive changes in one complete cycle until tube 13 is again contracted and the hose 10 has traveled to the left a distance of X. Rows or stages (b), (c) and (d) of FIGURE 3 show the tube 13 progressively expanded while the tube 12 is progressively contracted, keeping the sum of the diameters of the two tubes constant. During the time interval (b), (c) and (d), the various turns of tube 11 are equally spaced and tube 11 has the largest diameter so that each turn of tube 11 frictionally engages the inner surface of the tubular passage within which the hose 10 is positioned, such as intestines, and holds its position. At the same time tube 13 having a lower friction because of its smaller diameter is moved forward as tube 12 gets smaller until the diameter of tube 13 reaches maximum at row (d). Tubular member 13 has now changed its relative position with respect to tube 11. In the next three rows or stages, (e), (f) and (g), tube 13 at maximum diameter provides the holding friction while tubes 12 and 11 are advanced by expanding the diameter of tube 12 and contracting the diameter of tube 11. In the remaining rows or stages (h), (i) and (j), tube 12 is of maximum diameter and provides the holding friction while tube 13 contracts in diameter and tube 11 expands. The reference line marked REF in FIGURE 3 shows a fixed position with respect to the tubular passage the hose is inserted into, and it can be seen that the tube 11 has been moved a distance of X from the REF position. By reversing the driving motor 25, the above operation brought about by the respective pumps 21, 22 and 23 will reverse and the sequential pattern of expansion and contraction of the tubes 11, 12, 13 causes the hose 10 to propel itself in the opposite direction for removal from the body, for example.

A second or alternate type of self-propelling hose is illustrated in the embodiment shown in FIGURE 4. The hose 50 consists of four parallel connected helical tubes 51, 52, 53, and 54 which are joined together continuously along the outer adjacent walls to define the walls of hose 50. The tubes 51 and 53 expand and contract radially while the tubes 52 and 54 expand and contract longitudinally with respect to the length of the hose 50. In operation, the expanded tube 51 holds against the walls of the tubular passage the hose 50 is inserted into and the tube 54 pushes the deflated tube 53 forward and to the left. At the same time tube 52 is contracting or deflated longitudinally. The tube 53 is then expanded to frictionally engage the walls of the tubular organ within which the hose 50 is inserted, and the tube 51 is contracted or deflated to be pushed to the left by the longitudinally expanding tube 52 and the contracting tube 54. In the arrangement shown in FIGURE 4 the tubes 51 and 53 may retain their substantial horizontal width with various pressures produced by embedding elastic cords 55 shown in cross section running along the turns of the tubes 51 and 53. The inner pressure of the hose 50 is operated at a sufficient enough pressure to keep the non-elastic cords taut. Similarly the longitudinally expanding bellow-like tubes 52 and 54 may have non-elastic cords 56 located at the bends of the bellow-like structure as shown in FIGURE 4 to retain the radial length with various pressures produced. This stiffening may also be provided by a variety of other means such as stiffening pins embedded in the tubular structure.

A third embodiment of the present invention takes the form shown partly in cross-section in FIGURE 5. FIGURE 5 shows part of a self-propelling hose 60 made up of aligned parallel connected expandable tubes 62 through 64 and 66 through 68 and overlapping parallel connected expandable tubes 61 and 65. Tube 61 is mounted upon tubes 62 and 68, and tube 65 is mounted over tubes 64 and 66 as shown diagrammatically in FIGURE 6. The tubes 62 through 64 and 66 through 68 are wound in parallel and in an aligned fashion to form a plurality of aligned parallel helices defining a larger tubular member. The adjacent part of the outer walls of each of these adjacent tubular members are joined together along the adjacent length thereof to form a hose. At one end of the hose 60, the tubes are sealed and joined together to terminate the hose 60. The tubes 61 through 68 are controlled from a remote point by connecting the extension of tubes 61 through 68 to a plurality of pumps or other means in the nature of the arrangement shown in FIG. 2 for sequentially expanding and contracting the plurality of tubular members in the manner shown diagrammatically in FIGURE 6.

In the operation of the embodiment of FIGURE 5, the self-propelling action of the hose 60 can be understood by the diagram shown in FIGURE 6 where the top row of circles (a) represent the relative diameters of the tubes 61 through 68 for the particular phase or stage of the cycle shown in FIGURE 5. In stages (a), (b), (c) and (d) the tube 61 is expanded for frictionally holding to the tubular passage within which the hose 60 is positioned, while the tubes 66, 67 and 68 expand and the tubes 62, 63 and 64 contract to move the contracted overlapping tube 65 forward. At the stage (d) shown in FIGURE 6 the tube 65 is expanded for holding frictionally to the tubular organ within which the hose 60 is located, and at stage (e) overlapping tube 61 is contracted. In stages (f) and (g) of FIG. 6 tube 61 is moved forward and in stages (h) and (i) the holding duty is transferred from tube 65 and tube 61 as obtained in the original stage (a). The vertical broken reference line indicates a fixed location in a tubular passage within which the hose 60 is positioned, while the dotted line 69 indicates the progression of the tube 61 through a net distance of Y at stage (i). It is to be noted that the required advancing motion of tube 65 with respect to tube 61 is augmented by the fact that tubes 61 and 65 are tilted toward each other as is shown at stage (d) for example since tube 65 is mounted upon tubes 64 and 66 and tube 65 is tilted to the left when tube 64 is smaller than tube 66.

It is to be considered in the construction of the expandable and flexible tubular members that not all materials have a linear relation between stress and strain. Making the walls of the tubes alternately thick and thin as by circular and/or longitudinal corrugations can change the stress/strain relationship of the material used in making the tubular members. Consideration must also be made of the fact that the presence of strain in one direction affects the stress/strain behavior in other directions and that a given fluid pressure in a simple tube normally causes more wall tension in the circumferential direction than in a longitudinal direction.

It is contemplated that a hose could be adapted for use in a moderate range of different size passages in the body or other tubular member by adjusting the fluid pressure in the center of the hose to facilitate the changing of the overall diameter of the hose without having to apply a high fluid pressure thereto which would be impractical in the human body. The term fluid pressure as has been described in the preferred embodiments describes a substance such as a liquid or a gas which is capable of flowing and usually does not resist forces which change the shape but not its volume.

The above described clinical hoses may be used for a variety of applications. FIG. 7 shows a hose 70 such as those shown above being compartmentalized and being used to train and exercise the muscles and the nervous control system of the human colon to expel feces by simuuating movable feces in the colon. In operation, the hose 70 is by means of tubular members as shown in FIG. 1 but not shown in FIG. 7 first self-propelled into the desired position in the intestinal tract, for example. Once positioned, the internal compartment construction of the hose 70 can be used for treatment as shown in FIG. 7. FIGURE 7 shows compartment separators 71 forming along hose 70 compartments 72A, 74A and others not shown. The various compartments of the hose 70 are connected by corresponding tubes 72 through 77 to pliable bags 82 through 87. Pressure to the pliable bags is supplied by supply 88 through suitable valves, for example, valve 89 in the case of bag 87, and a confining drum 80. A roller 81 carried on a crank 98 is driven to compress one or two of the bags 82 through 87 in a sequence in time in response to motor drive 90 and motor control 91. The fluid from the compressed bags 82 through 87 reaches the corresponding compartments 72A, 74A and others not shown of the hose 70 in sequence causing an enlargement of the hose to progress along its length. For each rotation of the crank 98 a simulated process of peristalsis takes place. Pressure sensors 92 through 97 on each connecting tube 72 through 77 are wired to a computer motor control 91 to regulate the motor speed in response to a muscular action of the patient. The main use of this might be for the treatment of chronic constipation and for giving periodical colon exercise in cases where the colon may have been bypassed in colostomy.

FIGURE 8 shows a small television camera 106 mounted at the "head" or tapered end of the clinical hose made up of tubular members 101, 102 and 103 as previously described. The hose in FIGURE 8 is shown mounted inside an intestine 105. A wide angle lens 108 projects an image of the intestine wall upon a photosensitive screen 110. An incandescent lamp 107 illuminates the subject 105, and a wire cable 111 transmits the television signal to an outside television display. Alternatively, the camera 106 could be a film camera or a fiber-optic picture pickup for remote viewing.

FIGURE 9 shows a medicine applicator for use in the clinical hose. After being propelled to the proper position (perhaps determined by X-ray fluoroscope), a remotely controlled plunger 113 is pushed forward by the iron plug 114 in a solenoid coil 115 to expell the medicine 116 rupturing the fragile cover 117.

FIGURE 10 shows a similary operating magnetic solenoid device for obtaining a local clinical specimen. During insertion the device is closed as seen at (a) of FIG. 10. The specimen is collected by a soft absorbant plastic swab like structure 119 which folds by spring like action when pushed out of the case 121 by a plunger 123. When the swab is withdrawn into the case 121 its contents are protected by the cover 124. A mechanism similar to that shown in FIGURE 10 would be useful in applying a short time local treatment of radium. For the application a radium capsule would be mounted on the plunger in the position of swab 119 in view (a) of FIGURE 10. The case 121 and cover 124 would protect the tissue against radiation except when the radiant capsule was extended.

FIGURE 11 shows a clinical head for use with the clinical hose for performing minor surgery. For example a small protruding growth in the track of the tubular organ would be cut off by a rotating cutter 125 driven by geared motor 126 if the growth entered a slit 128 in case 127.

FIGURE 12 shows a clinical head for picking up a foreign object such as a safety pin or ring 137. Remotely controlled gear motor 138 turns a nut 134 on screw 135 to expel and withdraw a pair of tongs 136 out of casing 140. When the clinical hose is used for tract cleaning of the intestinal tract separate hose or hoses not shown can be carried by the clinical hose to supply a cleaning fluid or vacuum to the head of the clinical hose and/or to remove waste. To facilitate the cleaning process a rotating brush may be used with a hydraulic motor. Also by providing a sequence of pressures in the tubes making up the clinical hose, the relative motion of the inflated helices may be used to massage the walls of the passage.

While we have above described the principles of our invention in connection with specific apparatus, it is to be clearly understood that this description is made by way of example only and not as a limitation to the scope of our invention as set forth in the objects thereof and in the accompanying claims.

What is claimed is:

1. A self-propelling hose comprising,
    a plurality of expandable tubular members helically wound in parallel with said members having their adjacent surfaces joined along the lengths thereof to form said hose,
    said members being constructed so that as one of the members is expanded and held in position the other members can change their position relative thereto and
    means for coupling said tubular members to means for sequentially expanding and contracting said tubular members.

2. A self-propelling hose comprising,
    a plurality of expandable tubular members helically wound in parallel with said members having their adjacent surfaces joined along the lengths thereof to form said hose,
    and means by which said members can be sequentially expanded and contracted.

3. A self-propelling hose for use in a tubular passage comprising
    a plurality of flexible and expandable tubular members, said plurality of tubular members being helically wound in parallel so that the turns thereof form a plurality of parallel helices, said helically wound tubular members being joined along their lengths at the adjacent outside surfaces thereof to form a hose, said plurality of tubular members each being terminated at one end,
    and remote means coupled to the other ends of said members for sequentially expanding and contracting said tubular members along their length so that as at least one of said tubular members expands and frictionally holds to said passage the other of said tubular members change their position relative to said one expanded tubular member.

4. The self-propelling hose as claimed in claim 3 wherein said plurality of tubular members when helically wound form said hose tapered at one end to facilitate entrance into and exit out of said tubular passage.

5. The self-propelling hose as claimed in claim 3 wherein said plurality of tubular members includes radially expandable tubes and longitudinally expandable tubes and wherein said remote means includes means alternately expanding and contracting said radially expanding tubes while alternately expanding and contracting said longitudinally expandable tubes.

6. The self-propelling hose as claimed in claim 5 wherein the walls of said tubular members have stiffening members therein to control the rate of expansion of said tubular members with change in pressure.

7. The self-propelling hose as claimed in claim 3 wherein said plurality of tubular members includes a plurality of aligned expandable tubular members joined together along their adjacent outer walls and includes overlapping tubular members which are each joined to two of said aligned expandable tubular members, wherein said remote means includes means for alternately expanding and contracting said overlapping tubular members while alternately expanding and contracting said aligned tubular members.

8. A self-propelling hose for use in a tubular passage comprising:
   three flexible and expandable parallel connected aligned helically wound tubular members, said tubular members being joined together continuously along their outer adjacent walls to define a hose, said tubular members being terminated at one end,
   and means coupled to said three expandable tubular members for sequentially expanding and contracting said tubular members along their entire length so that as a given one of said tubular members expands and frictionally holds to said passage the other of said tubular members change their position relative to said given expanded tubular member.

9. A self-propelling hose for use in a tubular passage comprising
   three flexible and expandable parallel connected aligned helically wound tubular members, said tubular members being joined together continuously along their outer adjacent walls to define a first hose, said tubular members being terminated at one end and joined together and tapered at said one end to terminate said hose,
   a second hose coupled to the opposite end of said first hose,
   means coupled to said second hose for expanding and contracting said first and said second hose to adjust to said tubular passage,
   and means coupled to said three expandable tubular members for sequentially expanding and contracting said tubular members along their length so that as one of said tubular members expands and frictionally holds to said passage the other of said tubular members change their position relative to said one expanded tubular member.

10. The self-propelling hose as described in claim 9 wherein said second remote means includes three fluid pumps which are phased 120° apart for sequentially pumping fluid into said three tubular members.

11. A self-propelling hose for use in a tubular passage comprising
    at least four flexible and expandable tubular members, said plurality of tubular members being helically wound in parallel forming a plurality of aligned helices, said plurality of helical tubular members being joined along the adjacent lengths thereof to form a hose, said tubular members having at least one set of radially expandable tubes and one set of longitudinally expandable tubes placed alternately, said plurality of tubular members being terminated at one end,
    and remote means coupled to said tubular members at the other end thereof for expanding one of said radially expanding tubular members to frictionally hold to said passage and deflate said other radially expanding tubular member while expanding a longitudinally expanding tubular member to push said deflated radially expanding member in a given direction against a deflated longitudinally expanding tubular member.

12. A self-propelling hose for use in a tubular passage comprising
    a plurality of aligned parallel connected expandable tubular members, said plurality of aligned tubular members being helically wound in aligned parallel fashion,
    a second plurality of tubular members overlapping some of said first plurality of tubular members in a manner so that said overlapping tubular members are mounted over more than one aligned tubular member,
    said first and second plurality of tubular members each being terminated at one end,
    and remote means coupled to said first and second plurality of tubular members at the other ends thereof for alternately expanding and contracting said overlapping tubular members while alternately expanding and contracting said aligned tubular members.

References Cited

UNITED STATES PATENTS

| 2,139,888 | 12/1938 | Fausek et al. | 138—115 |
| 2,356,659 | 8/1944 | Aguiar | 128—276 |
| 2,855,934 | 10/1958 | Daughaday | 128—349 |
| 3,058,473 | 10/1962 | Whitehead | 128—349 |
| 3,071,137 | 1/1963 | Niebel et al. | 128—276 |
| 3,101,085 | 8/1963 | Murphy | 128—325 |
| 3,167,067 | 1/1965 | Rand | 128—327 |
| 3,168,092 | 2/1965 | Silverman | 128—348 X |
| 3,279,460 | 10/1966 | Sheldon | 128—6 |

DALTON L. TRULUCK, Primary Examiner

U.S. Cl. X.R.

15—104.05; 128—348, 356; 138—116, 154